(12) United States Patent
Vella et al.

(10) Patent No.: US 7,267,788 B2
(45) Date of Patent: Sep. 11, 2007

(54) CAVITY-CREATING TOOL FOR FOAMING OPERATION

(75) Inventors: John R. Vella, Troy, MI (US); Paul F. Zelazny, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/327,120

(22) Filed: Jan. 6, 2006

(65) Prior Publication Data

US 2007/0158528 A1  Jul. 12, 2007

(51) Int. Cl.
*B29C 33/30* (2006.01)
(52) U.S. Cl. .................. 264/63; 264/142; 264/177; 264/180; 264/183; 264/185; 425/127; 425/468; 425/DIG. 10
(58) Field of Classification Search ............... 425/127, 425/468, DIG. 10; 249/63, 142, 177, 178, 249/180, 183, 185
See application file for complete search history.

(56) References Cited

U.S. PATENT DOCUMENTS

| | | | | |
|---|---|---|---|---|
| 2,644,997 A | * | 7/1953 | Billings .................. | 249/99 |
| 3,052,945 A | * | 9/1962 | Cummings .............. | 249/9 |
| 3,136,022 A | * | 6/1964 | Dohren .................. | 249/9 |
| 3,589,664 A | * | 6/1971 | Middlestadt ............ | 404/89 |
| 4,594,205 A | * | 6/1986 | Wunderlich et al. .... | 264/31 |

* cited by examiner

*Primary Examiner*—Robert Davis
*Assistant Examiner*—Joseph Leyson

(57) ABSTRACT

A tool creates a fastener-receiving cavity within a foam-filled structure that includes a panel with a slot for receiving the fastener and foam backing that is cast in place against on the underside of the panel. The tool includes a clip and a plunger. The clip is inserted into the slot and has legs joined by a hinge. The plunger is inserted between the legs to spread the legs and fills the space between the spread-apart legs that would otherwise become filled with foam. After the foam is cast, the plunger is removed so that the legs can be returned to a closely spaced relationship and the clip is removed from the slot, leaving a cavity for subsequently receiving a fastener.

15 Claims, 5 Drawing Sheets

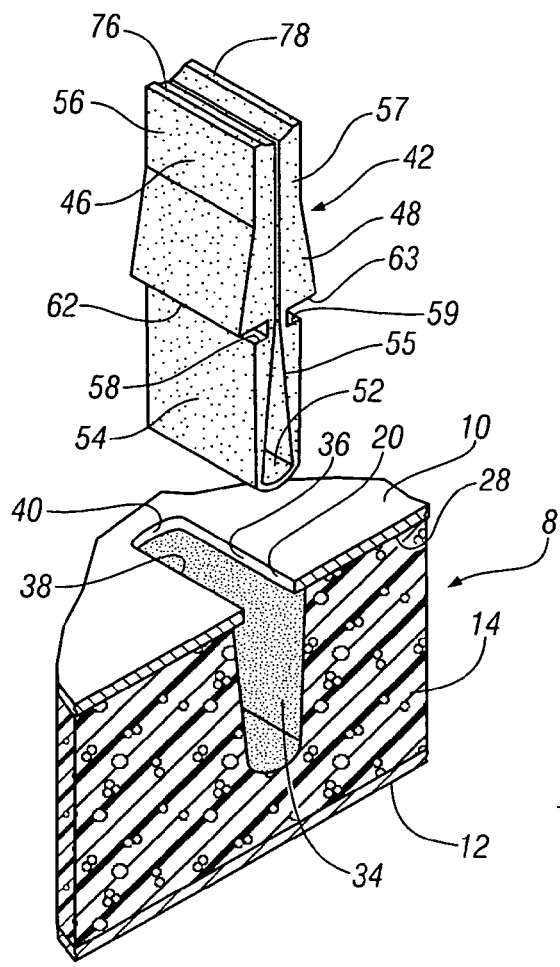
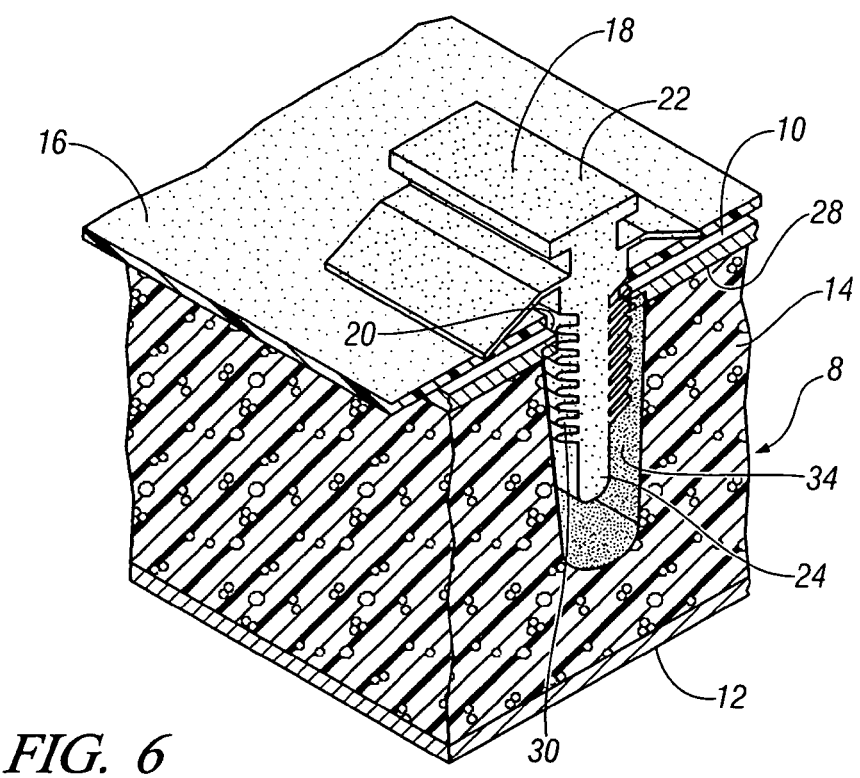
FIG. 5
FIG. 6

CAVITY-CREATING TOOL FOR FOAMING OPERATION

FIELD OF THE INVENTION

The present invention relates to filling a hollow structure with foam and more particularly to a tool for creating a fastener receiving cavity within a foam-filled hollow structure of the type having a panel provided with a slot for receiving the fastener and a foam backing that is cast in place on the underside of the panel.

BACKGROUND OF THE INVENTION

It is known in the motor vehicle and other industries that it is desirable to fill a hollow structure with a cast foam. The foam is injected into the space in its liquid state and then expands and cures to fill the hollow space. The foam can stiffen and strengthen the structure. The foam can also quiet the structure against noise transmission and vibration, and provide other advantages.

It is also known to be desirable to provide a slot in a panel that defines the hollow structure, so that a push-in type fastener can be installed for the purpose of attaching a trim panel or other component to the panel.

It would be desirable to provide a cavity within the cast-in-place foam so that a push-in type fastener can easily be installed without interference from the foam.

SUMMARY OF THE INVENTION

A tool creates a fastener receiving cavity within a foam-filled structure of the type having a panel provided with a slot for receiving the fastener and a foam backing that is cast in place on the underside of the panel. The tool includes a clip and a plunger. The clip is inserted into the slot prior to the casting in place of the foam and has legs joined by a hinge portion so that the legs can spread apart to occupy space on the underside of the panel that would otherwise become filled with foam. The plunger is inserted between the legs to fill the space between the spread-apart legs that would otherwise become filled with foam. After the foam is cast, the plunger is removed so that the legs can be returned to a closely-spaced relationship and the clip can be removed from the slot. A fastener-receiving cavity is thereby provided in the foam in communication with the slot for subsequently receiving a fastener.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a perspective view showing the clip removed from the slot so that a fastener-receiving slot has been formed in the cast-in-place foam;

FIG. 6 is a perspective view showing that a push-in type plastic fastener has been installed in the slot to attach a trim panel to the foam-filled structure.

DETAILED DESCRIPTION OF THE EXEMPLARY EMBODIMENTS

Figure 1:
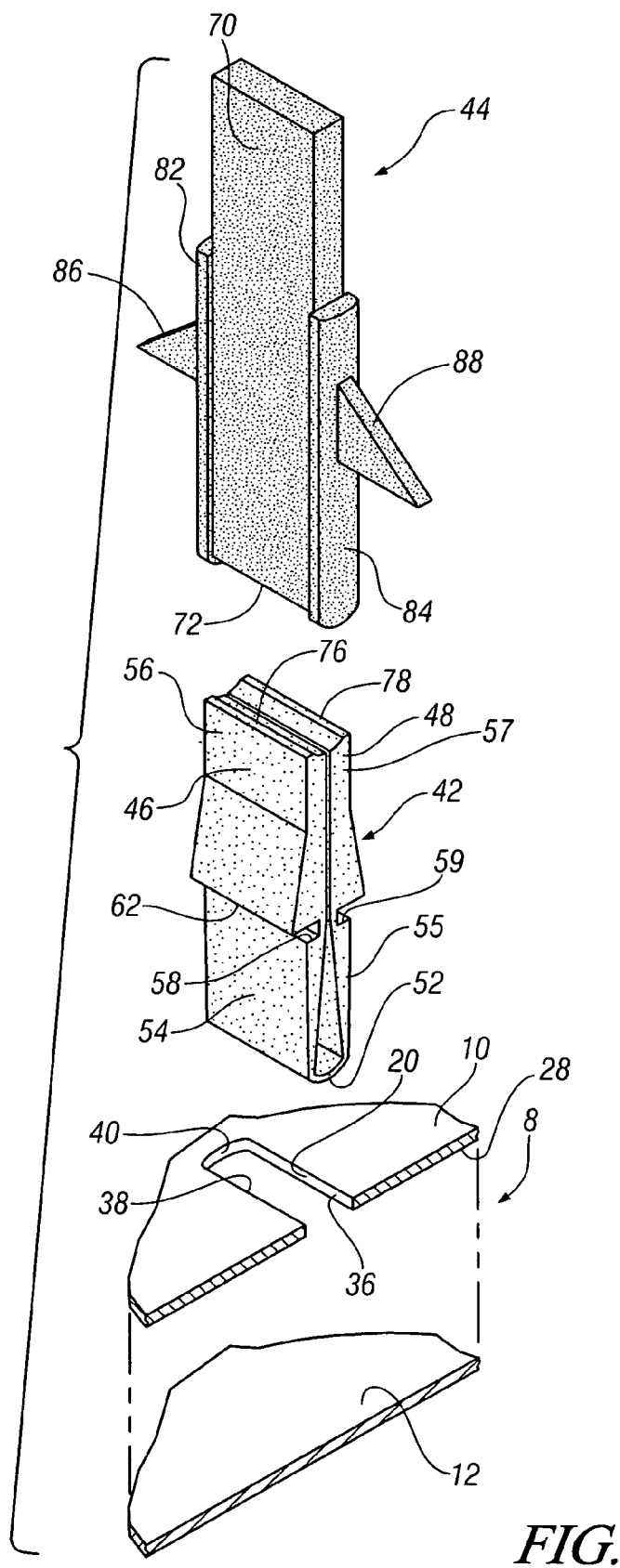
FIG. 1 is a perspective view showing a hollow structure defined by a slotted panel and a tool including a clip and a plunger.

Referring to FIG. 6, a hollow foam-filled vehicle body structure, generally indicated at 8, is defined by an upper panel 10 and a lower panel 12 that are spaced apart. Foam 14 has been cast between the panels 10 and 12 to fill the hollow structure 8. A trim panel 16, of molded plastic, has been attached to the hollow structure 8 by a push-in type plastic fastener 18 that has been inserted through a slot 20 in the upper panel 10. The push-in type fastener 18 has a stem 24 that carries a plurality of fins 30 along its length. The fins 30 flex as the stem 24 is inserted through the slot 20, and upon reaching the fully installed position of FIG. 6, one pair of the fins 30 engage against the underside 28 of the upper panel 10. The cast-in-place foam 14 has a cavity 34 formed therein so that the stem 24 and the fins 30 of fastener 18 may be freely inserted without interference from the foam 14.

Referring now to FIG. 1, it is seen that the slot 20 of the upper panel 10 is defined by side walls 36 and 38, an end wall 40, as well as another end wall, not shown, that is opposite to the end wall 40. The end wall 40, and the opposite end wall, are preferably curved, as shown, but may be straight.

A tool is provided for forming the cavity 34, and includes a clip 42 and a plunger 44. As seen in FIG. 1, the clip 42 is of molded plastic and has legs 46 and 48 that are connected by a hinge portion 52 at the lowermost end of the legs 46 and 48. The lower parts of the legs 46 and 48, adjacent to the hinge 52, are wedge shaped and define cavity-forming portions 54 and 55. Finger grips 56 and 57 are provided at the upper end of the legs 46 and 48. The finger grips 56 and 57 are touching or closely spaced adjacent one another. The legs 46 and 48 have grooves 58 and 59 intermediate the cavity-forming portions 54 and 55 and the finger grips 56 and 57. The top walls of the grooves 58 and 59 are defined by shoulders 62 and 63 that project outward above the cavity-forming portions 54 and 55.

Figure 2:
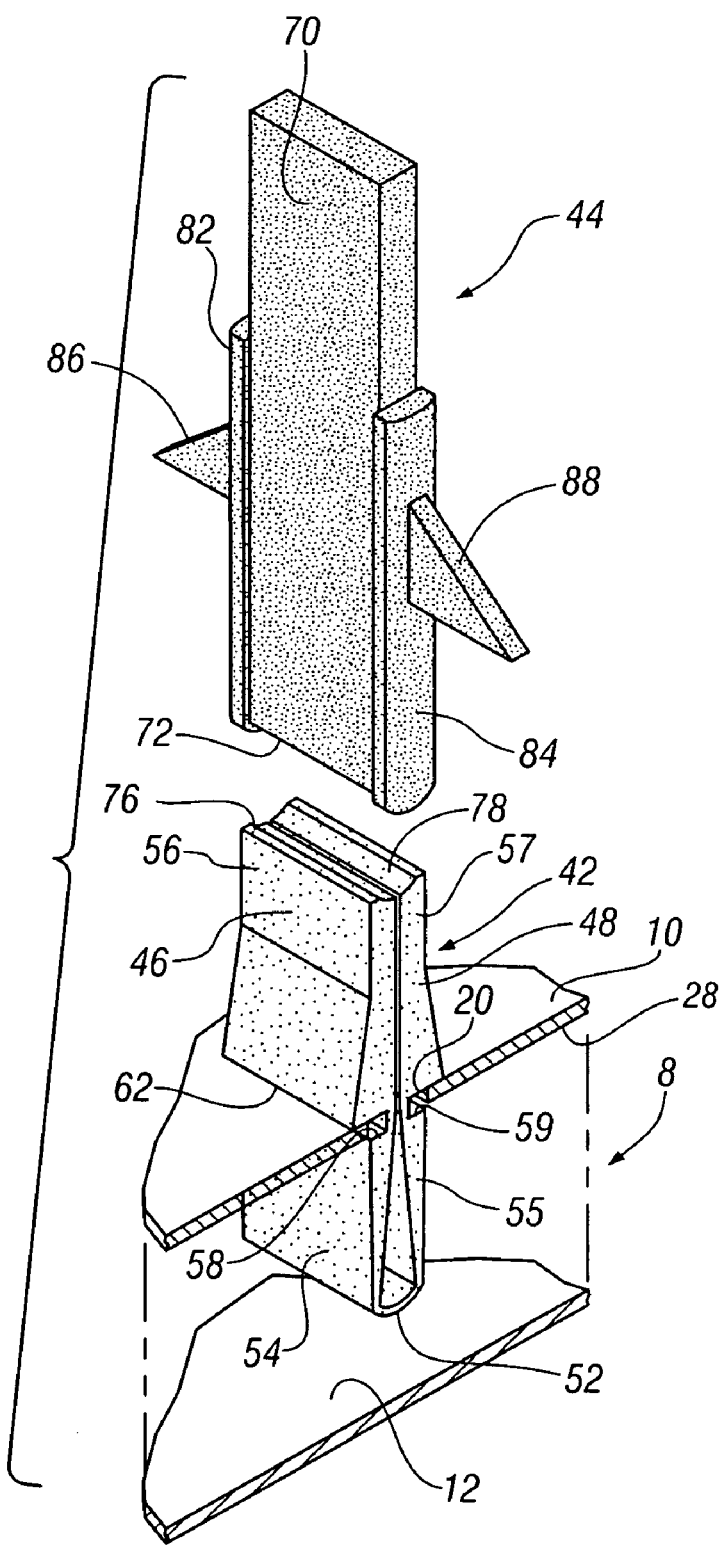
FIG. 2 is a perspective view showing the clip inserted into the slot of the panel.

As seen in FIG. 2, the clip 42 is inserted into the slot 20 of the hollow structure 8 prior to the casting of the foam 14. The insertion of the clip 42 is performed by an assembly operator who grips the finger grips 56 and 57 and inserts the clip 42 until the insertion is stopped by the engagement of the shoulders 62 and 63 with the upper panel 10. With the clip 42 thus inserted, the cavity-forming portions 54 and 55 are situated inside the hollow structure 8. The depth of the grooves 58 and 59 is such that the wedge shape of the cavity-forming portions 54 and 55 underlies the underside 28 of the upper panel 10 in a region surrounding the slot 20.

Referring again to FIG. 1, it will be understood that the insertion of the clip 42 into the slot 20 is facilitated by the clip 42 being molded with upper part of the cavity-forming portions 54 and 55 being of the same dimension as the distance between the side walls 36 and 38 of the slot 20.

Figure 3:
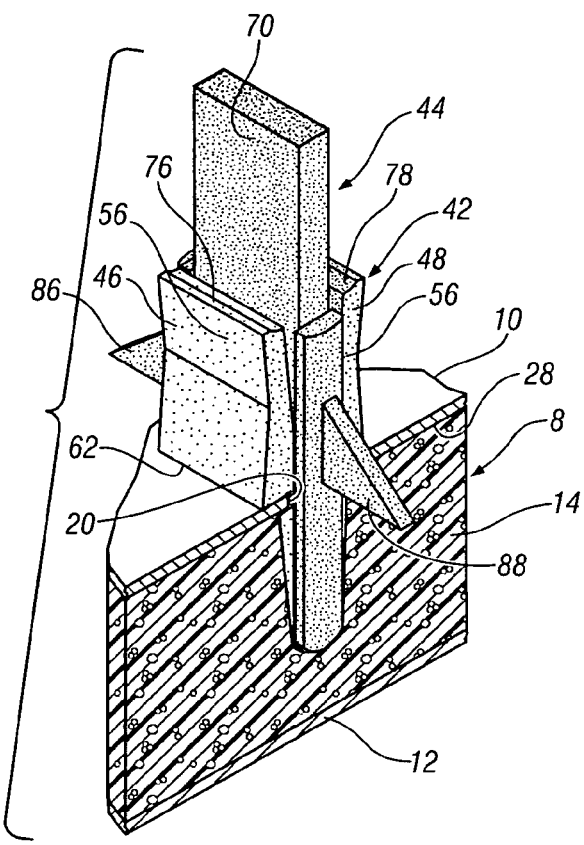
FIG. 3 is a perspective view showing the plunger inserted to spread apart the legs of the clip, and also showing foam that has been cast in place to fill the hollow structure and surround the clip and the plunger.

In FIG. 3, the plunger 44 has been inserted between the legs 46 and 48 of the clip 42. As best seen in FIG. 2, the plunger 44 has a rectangular body 70 with a rounded lower end 72, and the upper ends of the clip legs 46 and 48 have rounded corners 76 and 78. Thus, upon downward insertion of the plunger 44 by the assembly operator, the rounded lower end 72 of the plunger 44 will engage with the rounded corners 76 and 78 to cam the legs 46 and 48 apart as the plunger 44 is inserted. The spreading of the legs 46 and 48 is enabled by the grooves 58 and 59 of the legs which allow the legs to spread without interference with the side walls 36 and 38 of the slot 20.

Figure 4:
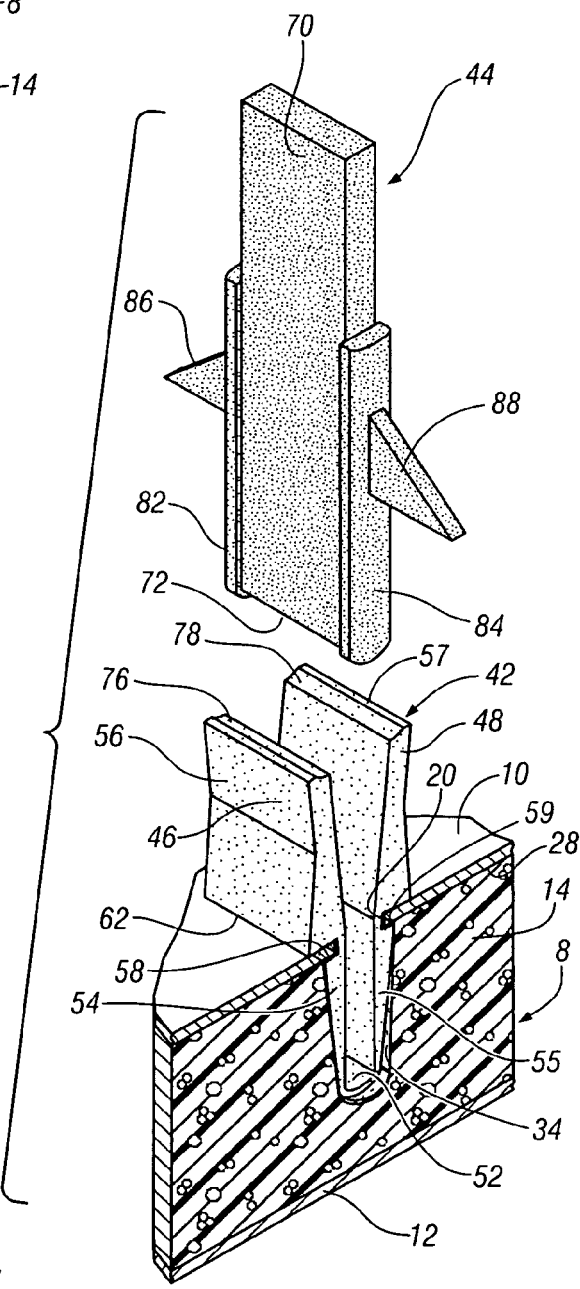
FIG. 4 is a perspective view showing the plunger removed from the clip.

Referring again to FIG. 2, it is seen that the plunger 44 also has end cap walls 82 and 84 that are spaced apart by a distance equal to the width of the clip legs 46 and 48. Thus, the end cap walls 82 and 84 engage with the clip legs 46 and 48 to align the insertion of the plunger 44 into the clip 42, and also, as best seen in FIG. 4, the end cap walls 82 and 84, in cooperation with the body 70 of the plunger, will occupy and close off the space that would otherwise exist between the spread-apart legs 46 and 48 of the clip 42. In addition, the end caps 82 and 84 have a curved shape to fit closely with the end wall 40 of the slot 20. The plunger 44 has abutments 86 and 88 that project therefrom and engage with the top panel 10 to limit the insertion of the plunger 44.

After the clip 42 and the plunger 44 have been inserted to the position of FIG. 3, foam 14 is cast into the hollow structure 8. The foam 14 is cast by injecting or pouring the foam in a liquid state, and allowing the foam to rise and foam and cure to fill the hollow space and adhere against the underside 28 of the upper panel 10. During the foaming operation, it will be understood that the presence of the clip 42 and the plunger 44 will function to occupy space that the foam 14 would otherwise occupy and fill. In addition, the foam 14 would rise into and through the slot 20 but for the presence of the clip 42.

After the foam 14 has adequately cured, the assembly operator will remove the plunger 44 as shown in FIG. 4. The hinge portion 52 will urge the legs 46 and 48 to return to their closely spaced position of FIG. 2. However, the foam 14 may adhere to the legs of the clip 42, thereby causing the legs 46 and 48 of the clip 42 to remain in their spread apart condition as shown in FIG. 4. The assembly operator will then grip the finger grips 56 and 57 of the legs 46 and 48 and squeeze the legs together to release the legs 46 and 48 from the foam 14, and then remove the clip 42 upwardly to the position of FIG. 5.

As seen in FIG. 5, the removal of the clip 42 and plunger 44 will leave the cavity 34 formed within the foam 14 and underlying the slot 20 of the upper panel 10.

It may be desirable to coat the clip 42 and the plunger 44 with a suitable release agent so that the foam 14 will not adhere to the clip 42 and the plunger 44. The release agent will facilitate the removal of the plunger 44, and upon the removal of the plunger 44, the legs 46 and 48 of the clip 42 will be free of adhesion to the foam 14 so that the hinge portion 52 of the clip 42 will be able to return the legs 46 and 48 of the clip 42 to their normal closely spaced apart relationship of FIG. 1.

Figure 7:
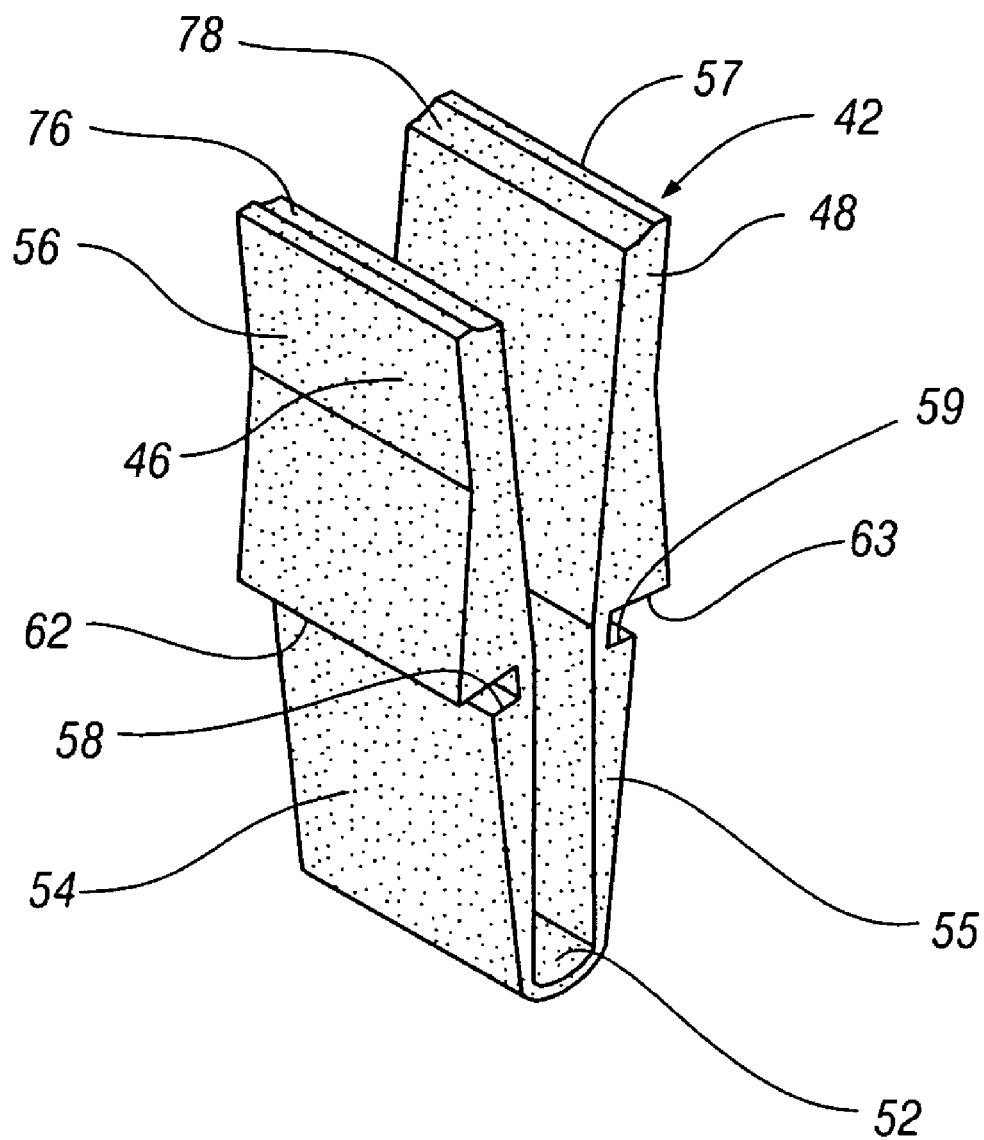
FIG. 7 is a perspective view of an alternative embodiment of the clip.

The foregoing description of the invention is merely exemplary in nature and, thus, variations thereof are intended to be within the scope of the invention. As described above, and shown in FIG. 1, the clip 42 is molded in a closed position in which the legs 46 and 48 are close together and then spread apart by the insertion of the plunger 44 between the legs 46 and 48. However, the clip 42 can also be molded in an open position in which the legs 46 and 48 are poised in the spread apart position as shown in FIG. 7. The clip of FIG. 7 is inserted into the slot 20 of the top panel 10 by squeezing together the finger grips 56 and 57 so that the wedge shaped lower portions 54 and 55 can pass between the side walls 36 and 38 of slot 20. Furthermore, as the clip 42 is inserted, the wedge shape of the wedge shaped lower portions 54 and 55 engage upon the side walls 36 and 38 of the slot 20 and act to cam the legs 46 and 48 toward the closed together position. After the clip 42 is fully inserted and the shoulders 62 and 63 engage the top panel 10, the assembly operator releases the finger grips 56 and 57 and the hinge 52 biases the legs 46 and 48 to their open positions. Thus, in the case of this clip 42 that is molded in the open position of FIG. 7, the plunger 44 will be inserted in order to occupy the space between the legs 46 and 48 and prevent the incursion of the foam 14. Because the legs 46 and 48 are self biased to their open and spaced apart position, the plunger 44 is not needed for spreading the legs 46 and 48, but functions to maintain the spread apart position against the pressure applied to the clip 42 by the rising foam 14.

What is claimed is:

1. A tool for creating a fastener receiving cavity within a foam filled structure having a panel provided with a slot for receiving the fastener and a foam backing that is cast in place on the underside of the panel, comprising:

a clip for insertion into the slot prior to the casting in place of the foam, said clip having legs joined by a hinge portion so that the legs are moveable between a closed together position permitting insertion of the clip into the slot and a spread apart position to occupy space on the underside of the panel that would otherwise become filled with foam, and a plunger for insertion between the legs to occupy the space between the spread apart legs that would otherwise become filled with foam, said plunger being removable after the foam is cast in place so that the legs can be moved to the close together position and the clip removed from the slot, whereby a fastener receiving cavity is provided in communication with the slot for receiving the fastener;

and said plunger having end caps at each end thereof to engage with the legs to close off the space between the spread apart legs.

2. The tool of claim 1 in which the clip is of molded plastic and molded with the legs in the closed together position and the plunger has a lower end that engages with the legs of the clip upon insertion of the plunger to force the legs to the spread apart position against the bias of the hinge portion.

3. The tool of claim 1 in which the clip is of molded plastic and is molded with the legs in the spread apart position and the clip has a finger grip on each legs by which the legs can be gripped to move the legs to the closed together position to allow the insertion of the clip into the slot of the panel.

4. The tool of claim 1 in which the clip is of molded plastic and is molded with the legs in the spread apart position, each leg having a wedge shape so that upon insertion of the clip into the slot of the panel the wedge shape of the legs cams the legs together toward the closed together position.

5. The tool of claim 1 in which each leg includes a cavity forming portion for positioning behind the underside of the panel, a finger grip portion at the end of the leg opposite the hinge portion by which the clip can be gripped for insertion and removal from the slot, and a groove intermediate the cavity forming portion and the finger grip portion for receiving a panel wall that defines the slot so that the legs can be fully spread and the cavity forming portion caused to underlie a region of the underside of the panel surrounding the slot.

6. The tool of claim 1 in which the plunger and the clip are shaped to act in cooperation with one another to fully close off the slot in the top panel when the clip and the plunger are fully inserted so that the foam is prevented from flowing through the slot.

7. The tool of claim 1 in which the clip has at least one shoulder for engaging with the top panel to limit the insertion of the clip into the slot.

8. The tool of claim 1 in which the plunger has at least one abutment thereon for engaging with the top panel to limit the insertion of the plunger into the clip.

9. A tool for creating a fastener receiving cavity within a foam filled structure having a panel provided with a slot for receiving the fastener and a foam backing that is cast in place on the underside of the panel, comprising:
   a clip for insertion into the slot prior to the casting in place of the foam, said clip having closely spaced legs joined by a hinge portion so that the legs can spread apart to occupy space on the underside of the panel that would otherwise be filled with foam,
   a plunger for insertion between the closely spaced legs to spread the legs, said plunger filling the space between the legs to occupy space between the spread apart legs that would otherwise be filled with foam and having end caps at each end thereof to engage with the legs to align the insertion of the plunger between the legs of the clip and to close off the space between the spread apart legs, said plunger being removable after the foam is cast in place so that the legs of the clip can be returned to closely spaced relation and the clip removed from the slot, whereby a fastener receiving cavity is provided in communication with the slot for receiving a fastener therein.

10. The tool of claim 9 further comprising a shoulder on at least one of the legs for engaging with the panel to stop the insertion of the clip when the clip reaches the desired degree of insertion.

11. The tool of claim 9 in which each leg includes a cavity forming portion closest to the hinge portion for positioning behind the underside of the panel, a finger grip portion at the end of the leg opposite the hinge portion by which the clip can be inserted and removed from the slot, and a groove intermediate the cavity forming portion and the finger grip for receiving the panel so that the legs can be fully spread and the cavity forming portion caused to underlie a region of the underside of the panel surrounding the slot.

12. The tool of claim 11 further comprising the cavity forming portion of each of the legs being wedge shaped.

13. The tool of claim 11 further comprising the groove being formed in part by a shoulder that engages with the panel to limit the insertion of the clip into the slot and thereby align the groove with the panel wall defining the slot so that the clip is properly positioned for receiving the plunger and spreading of the legs.

14. The tool of claim 9 in which the plunger carries at least one abutment of engaging with the panel to stop the insertion of the plunger at the proper degree of insertion into the clip.

15. the tool of claim 9 in which the plunger has a rounded lower end and the top of each leg is rounded so that upon insertion of the plunger the rounded lower end of the plunger engages with the rounded top of each leg to cam the legs apart.

* * * * *